(12) United States Patent
Shooshtari et al.

(10) Patent No.: US 9,034,970 B2
(45) Date of Patent: May 19, 2015

(54) CURABLE FIBERGLASS BINDER COMPRISING SALT OF INORGANIC ACID

(75) Inventors: Kiarash Alavi Shooshtari, Littleton, CO (US); Uranchimeg Lester, Littleton, CO (US); Jawed Asrar, Englewood, CO (US)

(73) Assignee: Johns Manville, Denver, CO (US)

(*) Notice: Subject to any disclaimer, the term of this patent is extended or adjusted under 35 U.S.C. 154(b) by 398 days.

(21) Appl. No.: 13/478,838

(22) Filed: May 23, 2012

(65) Prior Publication Data

US 2013/0133548 A1 May 30, 2013

Related U.S. Application Data

(63) Continuation-in-part of application No. 12/539,211, filed on Aug. 11, 2009.

(51) Int. Cl.
*C09D 101/02* (2006.01)
*C08G 12/06* (2006.01)
*C08L 61/22* (2006.01)

(52) U.S. Cl.
CPC ............. *C09D 101/02* (2013.01); *C08G 12/06* (2013.01); *C08L 61/22* (2013.01)

(58) Field of Classification Search
CPC .................................................. C09D 101/02
See application file for complete search history.

(56) References Cited

U.S. PATENT DOCUMENTS

| | | | |
|---|---|---|---|
| 1,801,053 A | 4/1931 | Meigs | |
| 3,006,879 A | 10/1961 | Ryan et al. | |
| 3,383,267 A | 5/1968 | Sundén | |
| 3,513,001 A | 5/1970 | Worthington et al. | |
| 4,048,127 A | 9/1977 | Gibbons et al. | |
| 4,410,685 A | 10/1983 | Williams | |
| 5,243,015 A | 9/1993 | Hutchings et al. | |
| 5,905,115 A | 5/1999 | Luitjes et al. | |
| 6,533,823 B2 * | 3/2003 | Nakashimada et al. | 8/405 |
| 7,265,169 B2 | 9/2007 | Li et al. | |
| 7,655,711 B2 | 2/2010 | Swift et al. | |
| 8,372,900 B2 | 2/2013 | Shooshtari et al. | |
| 8,377,564 B2 | 2/2013 | Shooshtari et al. | |

(Continued)

FOREIGN PATENT DOCUMENTS

DE 1905054 A1 8/1969
DE 10 2004 033561 9/2005

(Continued)

OTHER PUBLICATIONS

Opposition filed Sep. 26, 2014 by Knauf Insulation to European Patent No. EP2464771 granted Dec. 25, 2013, 21 pages.

(Continued)

*Primary Examiner* — Ling Choi
*Assistant Examiner* — Catherine S Branch
(74) *Attorney, Agent, or Firm* — Robert D. Touslee

(57) ABSTRACT

Formaldehyde-free binder compositions are described that include an aldehyde or ketone, a nitrogen-containing salt of an inorganic acid, and an acidic compound. The acidic compound may be an organic acid, such as maleic acid or citric acid among others. The acidic compound is supplied in quantities that lower the pH of the binder composition to about 5 or less. The binder compositions may be used in methods of binding fiberglass and the resulting fiberglass products have an improved tensile strength due to the addition of the acidic compound.

20 Claims, 2 Drawing Sheets

(56) References Cited

U.S. PATENT DOCUMENTS

| | | |
|---|---|---|
| 8,651,285 B2 | 2/2014 | Shooshtari et al. |
| 8,708,162 B2 | 4/2014 | Shooshtari et al. |
| 2005/0221705 A1 | 10/2005 | Hitch |
| 2007/0027283 A1 | 2/2007 | Swift et al. |
| 2007/0123679 A1 | 5/2007 | Swift et al. |
| 2007/0123680 A1 | 5/2007 | Swift et al. |
| 2008/0160854 A1 | 7/2008 | Nandi et al. |
| 2011/0021101 A1* | 1/2011 | Hawkins et al. .............. 442/327 |
| 2011/0039111 A1 | 2/2011 | Shooshtari |
| 2011/0040010 A1 | 2/2011 | Shooshtari |
| 2011/0042302 A1 | 2/2011 | Shooshtari et al. |
| 2011/0042303 A1* | 2/2011 | Shooshtari et al. ........... 210/508 |
| 2011/0045966 A1 | 2/2011 | Shooshtari et al. |
| 2011/0046271 A1 | 2/2011 | Shooshtari et al. |

FOREIGN PATENT DOCUMENTS

| | | |
|---|---|---|
| EP | 1510607 A1 | 3/2005 |
| EP | 1652868 A1 | 5/2006 |
| EP | 2 223 941 | 9/2010 |
| EP | 2386605 A1 | 11/2011 |
| EP | 2464771 B1 | 12/2013 |
| EP | 2464772 B1 | 12/2013 |
| EP | 2467519 B1 | 12/2013 |
| GB | 2 451 719 | 2/2009 |
| WO | 00/17120 | 3/2000 |
| WO | 03/022899 A1 | 3/2003 |
| WO | 2004/076415 A1 | 1/2004 |
| WO | 2007/014236 A2 | 2/2007 |
| WO | 2009/149334 A2 | 12/2009 |
| WO | 2010/106181 A1 | 9/2010 |
| WO | 2010/108999 A1 | 9/2010 |
| WO | 2010/142568 A1 | 12/2010 |
| WO | 2011/019590 A1 | 2/2011 |
| WO | 2011/019597 A1 | 2/2011 |
| WO | 2011/022227 A1 | 2/2011 |

OTHER PUBLICATIONS

Opposition filed Sep. 26, 2014 by Knauf Insulation to European Patent No. EP2467519 granted Dec. 25, 2013, 10 pages.
Opposition filed Sep. 26, 2014 by Knauf Insulation to European Patent No. EP2464772 granted Dec. 25, 2013, 13 pages.

* cited by examiner

CURABLE FIBERGLASS BINDER COMPRISING SALT OF INORGANIC ACID

CROSS-REFERENCES TO RELATED APPLICATIONS

This application is a continuation-in-part of co-assigned U.S. patent application Ser. No. 12/539,211 filed Aug. 11, 2009. It is also related to co-assigned U.S. patent application Ser. Nos. 12/539,263; 12/543,607; 12/543,586; 12/543,625; 12/543,574; 12/633,828; 13/386,843; and 13/386,865. The entire contents of the above-listed applications are herein incorporated by reference for all purposes.

FIELD OF THE INVENTION

The subject invention pertains to an improved binding composition for use with fiberglass. More specifically, the invention pertains to an improved curable composition comprising a mixture of an aldehyde or ketone and a salt of an inorganic acid. Once applied as a coating on the fiberglass, the binding composition is cured. The binder of the present invention is useful as a fully acceptable replacement for formaldehyde-based binders in non-woven fiberglass products, and actually provides a binder exhibiting improved physical properties.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to a sheet or lofty fibrous product, following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solid liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet possess characteristics so as to form a rigid thermoset polymeric binder for the glass fibers when cured. A low binder viscosity in the uncured state is required to allow the mat to be sized correctly. Also, viscous binders commonly tend to be tacky or sticky and hence they lead to the accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out resins such as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) and hazardous air pollutants (HAPS) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as triethanolamine, glycerine, or a modestly oxyalkylated glycerine as a curing or "crosslinking" component. The preparation and properties of such poly(acrylic acid)-based binders, including information relative to the VOC emissions, and a comparison of binder properties versus urea-formaldehyde binders is presented in "Formaldehyde-Free Crosslinking Binders For Non-Wovens," Charles T. Arkins et al., TAPPI Journal, Vol. 78, No. 11, pages 161-168, November 1995. The binders disclosed by the Arkins article, appear to be B-stageable as well as being able to provide physical properties similar to those of urea/formaldehyde resins.

U.S. Pat. No. 5,340,868 discloses fiberglass insulation products cured with a combination of a polycarboxy polymer, a-hydroxyalkylamide, and at least one trifunctional monomeric carboxylic acid such as citric acid. The specific polycarboxy polymers disclosed are poly(acrylic acid) polymers. See also, U.S. Pat. No. 5,143,582.

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

U.S. 2007/0142596 discloses binders comprised of a mixture of Maillard reactants. The reactants comprise a monosaccharide and an ammonium salt of a polycarboxylic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting more complete cure. See also U.S. Pat. Nos. 5,661,213; 5,427,587; 6,136,916; and 6,221,973.

Some polycarboxy polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb liquid water, thereby possibly compromising the integrity of the product. Also, the thermosetting acrylic resins now being used as binding agents for fiberglass have been found to not react as effectively with silane coupling agents of the type traditionally used by the industry increasing product cost. The addition of silicone as a hydrophobing agent results in problems when abatement devices are used that are based on incineration as well as additional cost. Also, the presence of silicone in the manufacturing process can interfere with the adhesion of certain facing substrates to the finished fiberglass material. Overcoming these problems will help to better utilize polycarboxy polymers in fiberglass binders.

Accordingly, in one aspect the present invention provides a novel, non-phenol-formaldehyde binder.

Another aspect of the invention provides a novel fiberglass binder which provides advantageous flow properties, the possibility of lower binder usage, the possibility of overall lower energy consumption, elimination of interference in the process by a silicone, and improved overall economics.

Still another aspect of the present invention is to provide a binder for fiberglass having improved economics, while also enjoying improved physical properties. In addition, the present invention increases the sustainable portion of the binder and reduces the dependency on a fossil based source for the resin.

These and other aspects of the present invention will become apparent to the skilled artisan upon a review of the following description and the claims appended hereto.

BRIEF SUMMARY OF THE INVENTION

A curable composition for use in the binding of fiberglass is provided comprising a mixture of an aldehyde or ketone and an amine salt of an inorganic acid. The preferred acid is phosphoric acid. This composition upon curing is capable of forming a water-insoluble binder which exhibits good adhesion to glass.

Additional examples of the present curable, formaldehyde-free binder compositions include compositions having an aldehyde or ketone, a nitrogen-containing salt of an inorganic acid, and an acidic compound. The acidic compound may be an organic acid, such as maleic acid or citric acid among others. The acidic compound is supplied in quantities that lower the pH of the binder composition to about 5 or less. When the binder compositions are heat cured, the aldehyde or ketone react with the reaction product to form the polymerized binder.

A process for binding fiberglass is provided comprising applying to fiberglass a composition comprising an aldehyde or ketone and an amine salt of an inorganic acid. Thereafter the composition is cured while present as a coating on the fiberglass to form a water-insoluble binder which exhibits good adhesion to the fiberglass.

In a preferred embodiment the resulting fiberglass product is building insulation. In other embodiments the fiberglass product is a microglass-based substrate useful when forming a printed circuit board, battery separator, filter stock, or reinforcement scrim.

DETAILED DESCRIPTION OF THE INVENTION

Figure 1:
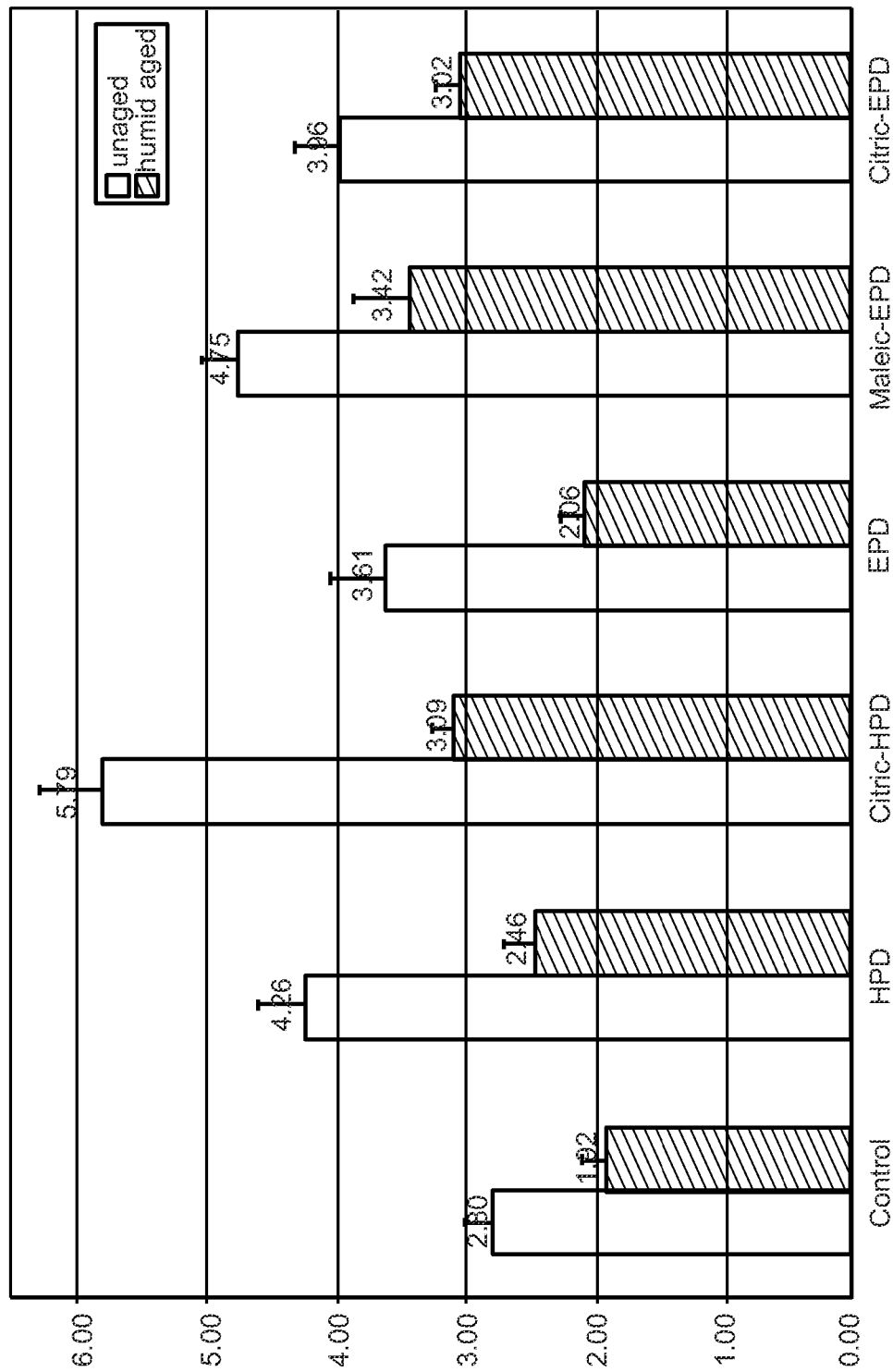
FIG. 1 is a graph showing tensile strength performance for a group of glass-fiber reinforced composites.

The novel fiberglass binder of the present invention is a curable composition comprising a carbonyl functional material, such as an aldehyde or ketone, and an amine salt of an inorganic acid. Once the curable composition is applied to fiberglass, it can be cured to provide a strong, water-insoluble binder, exhibiting good adhesion to the glass. The curing of the binder has also been seen to be much faster, thereby adding to the economic benefits of the binder.

The salt can be any amine salt of an inorganic acid. This includes ammonium salts and amine-acid salts, which are amine salts. Any suitable inorganic acid can be used. The acids can be oxygenated acids or non-oxygenated acids. Examples of suitable oxygenated acids include, but are not limited to, phosphoric acid, pyrophosphoric acid, phosphorus acid, sulfuric acid, sulfurous acid, hypochloric acid and chlorate acid. Examples of non-oxygenated acids include, but are not limited to, hydrochloric acid, hydrogen sulfide and phosphine. Phosphoric acid is most preferred.

The salt can be prepared using any conventional technique to create salts of inorganic acids. The salts may include unsubstituted ammonium salts of an inorganic acid such as phosphoric acid (i.e., $(NH_4)H_2PO_4$, $(NH_4)_2HPO_4$, and/or $(NH_4)_3PO_4$). Reacting ammonia ($NH_3$) with the acid will yield the salt. The salts may also include substituted ammonium salts where one or more of the hydrogen atoms are replaced by an organic moiety such as alkyl group. Substituted ammonium salts are also called amine-acid salts, and may be formed by reacting an amine (e.g., ethylene diamine) with the inorganic acid in water. The molar ratio of acid functionality to amine functionality can vary, and is generally from 1:25 to 25:1. More preferred is a ratio of from 1:5 to 5:1, with a ratio of about 1:2 to 2:1 being most preferred.

Example of amines which can be used include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, ethers and others. Representative amines that are suitable for use in such an embodiment include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and mixtures of these. A preferred diamine for use in this embodiment of the invention are 1,4-butanediamine and 1,6-hexanediamine. Examples of mono amines include, but are not limited to, methyl amine, ethyl amine, ethanol amine, diethanol amine, dimethyl amine, diethyl amine, aniline, N-methyl aniline, n-hydroxytheyl aniline, etc. Natural and synthetic amino acids such as glysine, lysine, arginine, histidine, cysteine, etc., can also be used.

When the ammonia and/or amine is mixed in aqueous solution with the inorganic acid, the more alkaline amine is protonated by the acid to form an ammonium cation that pairs with the deprotonated acid anion to form the ammonium salt. Thus, the above described amines form their protonated ammionium ions and pair with the deprotonated acid anion to form a nitrogen-containing (e.g., unsubstituted or substituted ammonium) salt of the inorganic acid. When these ammonium salts are formed in polar-protic solutions such as aqueous solutions, the ammonium cation and deprotonated acid anion of the salt may be in dissociated form.

To the solution of the amine salt of inorganic acid, the carbonyl functional materials can be added, especially an aldehyde or ketone. Due to their higher reactivity, aldehydes are preferred to ketones. The composition comprises the amine salt of inorganic acid and the aldehyde and/or ketone. Some small amount of reaction does take place within the composition between the components. However, the reaction is completed during the curing step, followed by the crosslinking reaction of curing.

During the curing stage, the binder composition is heated to temperatures that promote the reaction of the aldehyde or ketone and the amine salt of the inorganic acid. One reaction that may have a role in these cure temperature reactions is the Maillard reaction between reactive carbonyl groups of the aldehyde or ketone and nucleophilic amine groups of the amine salt. The initial reaction between the carbonyl and amine groups starts a series of reactions that ultimately form a polymer component of the cured binder.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, polyacrolein, copolymers of acrolein, and others. Reducing mono, di- and polysaccharides such as glucose, celobrose, maltose, etc. can be used, with reducing monosaccharides, such as glucose being preferred. A molar ratio of salt to carbonyl (saccharide) can vary, but is generally in the range of from 1:50 to 50:1. A ratio of 1:20 to 20:1 is more preferred, with a ratio of 1:10 to 10:1 being most preferred.

Examples of suitable ketones include, but are not limited to, acetone, acetyl acetone, 1,3-dihydroxy acetone, benzel, bonzoin and fructose.

The binder composition may also include acids that lower the overall pH of the binder. Exemplary acids include organic acids that have one or more carboxylic acid groups. For example, the organic acid may be a monocarboxylic acid such as a $C_1$-$C_{12}$ carboxylic acid (e.g., acetic acid), or an aromatic carboxylic acid (e.g., benzoic acid), among others. Exemplary organic acids may also include dicarboxylic acids such aliphatic dicarboxylic acids, unsaturated (e.g., olefinic) dicarboxylic acids, and aromatic dicarboxylic acids, among others. Exemplary aliphatic dicarboxylic acids may include oxalic acid, malonic acid, succinic acid, glutaric acid, adipic acid, pimelic acid, suberic acid, azelaic acid, sebacic acid, undecanedioic acid, and dodecanedioic acid, among others. Exemplary olefinic dicarboxylic acids may include maleic acid, fumaric acid, glutaconic acid, traumatic acid, itaconic acid, and muconic acid among others. Exemplary aromatic dicarboxylic acids may include phthalic acid, isophthalic acid, and terephthalic acid, among others. Exemplary organic acids may also include tricarboxylic acids such as citric acid, isocitric acid, aconitic acid, propane-1,2,3-tricarboxylic acid, and trimesic acid, among others. Still further examples of organic acids may include polycarboxylic acids having two or more carboxylic acid groups, such as mellitic acid, tartaric acid, etc.

The composition when applied to the fiberglass optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

The fiberglass that has the composition according to the present invention applied to it may take a variety of forms and in a preferred embodiment is building insulation. Use in roofing membranes is also preferable as good tensile and elongation is observed. In other embodiments the fiberglass is a microglass-based substrate useful in applications such as printed circuit boards, battery separators, filter stock, and reinforcement scrim.

The composition of the present invention can be applied to the fiberglass by a variety of techniques. In preferred embodiments these include spraying, spin-curtain coating, and dipping-roll coating. The composition can be applied to freshly-formed fiberglass, or to the fiberglass following collection. Water or other solvents can be removed by heating.

Thereafter the composition undergoes curing wherein a strong binder coating is formed which exhibits good adhesion to glass. Such curing can be conducted by heating. Elevated curing temperatures on the order of 100 to 300° C. generally are acceptable. Satisfactory curing results are achieved by heating in an air oven at 200° C. for approximately 5 to 20 minutes.

The cured binder at the conclusion of the curing step commonly is present as a secure coating on the fiberglass in a concentration of approximately 0.5 to 50 percent by weight of the fiberglass, and most preferably in a concentration of approximately 1 to 10 percent by weight of the fiberglass.

The present invention provides a formaldehyde-free route to form a securely bound formaldehyde-free fiberglass product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also seen to be much faster and therefore does favor the economics, while reducing the energy consumption during the curing process and lowering the carbon footprint. The binder also contains a high level of sustainable raw materials further reducing the dependency on fossil based sources for the resin.

EXAMPLES

The following examples are presented to provide specific examples of the present invention. In each instance the thin glass plate substrate that receives the coating can be replaced by fiberglass. It should be understood, however, that the invention is not limited to the specific details set forth in the Examples.

Example 1

To 1160 g of 1,6 hexanediamine (HDA) dissolved in 2140 g water, 980 g phosphoric acid was added slowly (molar ratio of 1:1) and the solution was stirred for 10 min. The opaque amino-acid salt solution was utilized in the formation of binder in the following examples.

Example 2

To 42.8 g of solution of Example 1 was added 18 g of anhydrous dextrose (alpha-D-glucose) dissolved in 18 g water. The solution was stirred at ambient temperature for 10 min. The solution was applied as a thin film on glass and Al panel, dried in an oven at 100° C. for 5 min and cured at 200° C. for 20 min. The cured brown polymer was hard and insoluble in water and solvents, and showed an excellent adhesion to glass.

Example 3

To 42.8 g of solution of Example 1, 54 g of anhydrous dextrose dissolved in 54 g of water was added. The solution was stirred at ambient temperature for 10 min. The solution was applied as a thin film on a glass and Al panel, dried in an oven at 100° C. for 5 min and cured at 200° C. for 20 min. The cured brown polymer was hard and insoluble in water and solvents, and showed an excellent adhesion to glass.

Example 4

To 42.8 g of solution of Example 1, 108 g of anhydrous dextrose dissolved in 108 g of water was added. The solution was stirred at ambient temperature for 10 min. The solution was applied as a thin film on a glass Al panel, dried in an oven at 100° C. for 5 min and cured at 200° C. for 20 min. The cured brown polymer was hard and insoluble in water and solvents, and showed an excellent adhesion to glass.

Example 5

To 42.8 g of solution of Example 1, 144 g of anhydrous dextrose dissolved in 144 g of water was added. The solution was stirred at ambient temperature for 10 min. The solution was applied as a thin film on glass and Al panel, dried in an oven at 100° C. for 5 min and cured at 200° C. for 20 min. The cured brown polymer was hard and insoluble in water and solvents and showed an excellent adhesion to glass.

Example 6

To 42.8 g of polymer of Example 1 was added 180 g of anhydrous dextrose dissolved in 180 g of water. The solution was stirred at ambient temperature for 10 min. The solution was applied as thin film on glass and Al panel, dried in oven at 100° C. for 5 min and cured at 200° C. for 20 min. The cured brown polymer was hard and insoluble in water and solvents, with excellent adhesion to glass.

Example 7

To 42.8 g of solution of Example 1 was added 216 g of anhydrous dextrose dissolved in 216 g of water. The solution was stirred at ambient temperature for 10 min. The solution was applied as a thin film on glass and Al panel, dried in an oven at 100° C. for 5 min. and cured at 200° C. for 20 min. The cured brown polymer was hard and insoluble in water and solvents, and showed an excellent adhesion to glass.

Example 8

To 42.8 g of solution of Example 1 added 270 g of anhydrous dextrose dissolved in 270 g of water. The solution was stirred at ambient temperature for 10 min. The solution was applied as a thin film on glass and Al panel, dried in an oven at 100° C. for 5 min. and cured at 200° C. for 20 min. The cured brown polymer was hard and insoluble in water and solvents and showed an excellent adhesion to glass.

Example 9

To 42.8 g of solution of Example 1 added 360 g of anhydrous dextrose dissolved in 360 g of water. The solution was stirred at ambient temperature for 10 min. The solution was applied as a thin film on glass and Al panel, dried in an oven at 100° C. for 5 min. and cured at 200° C. for 20 min. The cured brown polymer was hard and insoluble in water and solvents and showed an excellent adhesion to glass.

Example 10

Examples 2-9 were repeated in the presence of 5% by weight ammonium sulfate. The cured polymers became insoluble in water in less than 10 min.

Example 11

To 1160 g 1,6 hexanediamine dissolved in 3120 g of water, 1960 g phosphoric acid was added slowly (molar ratio of 1:2) and the solution was stirred for 10 min. The clear amino-acid salt solution was utilized in the formation of binders in the following examples.

Example 12

To 62.4 solution of Example 11 was added 18 g of anhydrous dextrose (alpha-D-glucose) dissolved in 18 g water. The solution was stirred at ambient temperature for 10 min. The solution was applied as a thin film on glass and Al panel, dried in an oven at 100° C. for 5 min and cured at 200° C. for 20 min. The cured brown polymer was hard and insoluble in water and solvents with excellent adhesion to glass.

Example 13

Example 11 was repeated with 54, 108, 144, 180, 216, 270 and 360 g dextrose dissolved in similar amounts of water. Each solution was stirred at ambient temperature for 10 min. Each solution was applied as a thin film on glass and Al panel, dried in an oven at 100° C. for 5 min and cured at 200° C. for 20 min. A cured brown polymer that was hard and insoluble in water and solvents with excellent adhesion to glass was obtained in each case.

Example 14

Examples 12 and 13 were repeated in the presence of 5% by weight ammonium sulfate. The polymers became insoluble in water in less than 10 min.

Example 15

Plant Trial

To examine the performance of the binder on insulation batt, a binder solution was prepared and applied in the manufacturing of the insulation batt. Processing and performance of the batts made with the binder of this invention was compared with the batts manufactured with a polyacrylic acid binder cured with triethanol amine. To prepare the binder, 196 kg phosphoric acid was dissolved in 2470 kg water. To this solution was added 2160 kg anhydrous dextrose. When the dextrose dissolved, 116 kg hexanediamine was added to this solution and dissolved. To this solution 123 kg ammonium sulfate was added. After all ingredients dissolved, the clear binder solution was utilized in the manufacture of R-19 and R-13 insulation batt. The binder was applied at the rate of 4.5% binder on glass fiber containing 1% (based on binder) of an amino-propyl silane coupling agent and about 0.5% dedusting oil. The batt was cured at 210° C. and oven residence time of two minutes. The 32" droop (sag) and recovery data for R-19 insulation batt products are presented in Table 1 and Table 2 respectively.

TABLE 1

32" Droop Data for R-19

|  | Unaged | 7 Day | 14 Day |
|---|---|---|---|
| Control (Acrylic) | 1.1 | 1.7 | 2.2 |
| HP | 1.0 | 1.3 | 1.6 |

TABLE 2

Recovery for R-19

|  | Unaged | 7 Day | 14 Day |
|---|---|---|---|
| Control (Acrylic) | 6.91 | 6.48 | 6.38 |
| HP | 6.85 | 6.55 | 6.41 |

As seen from Table 1 and Table 2, the R-19 insulation product of the new formaldehyde free binder of this invention (HPD) has similar performance compared to the commercial acrylic control.

Addition of Organic Acids to Binder Compositions

Another set of experiments was performed to measure the effect of the binder's pH on the tensile strength of the glass composites made with the binder. Binder compositions were prepared from a combination of a diamine (either ethylene diamine (E) or hexamethylene diamine (H)), phosphoric acid (P), and dextrose (D) in a mole ratio of diamine:phosphoric acid:dextrose of 1:1:4. Maleic or citric acid was added to the binder compositions in a 1:1 mole ratio of binder-to-acid. Control samples were also prepared from binder compositions having no added acid. Table 3 below describes the compositions and pHs of five binder samples used in the tensile strength tests that were graphed in FIG. 1:

TABLE 3

Compositions and pH of Diamine/Phosphoric Acid/Dextrose Binders:

| Entry | Diamine | Organic Acid | Moles of Acid | pH |
|---|---|---|---|---|
| 1 | Ethylene Diamine | None | 0 | 5.8 |
| 2 | Ethylene Diamine | Maleic Acid | 1 | 3.1 |
| 3 | Ethylene Diamine | Citric Acid | 1 | 3.2 |
| 4 | Hexamethylene Diamine | None | 0 | 7.2 |
| 5 | Hexamethylene Diamine | Citric Acid | 1 | 3.4 |

As shown in Table 3, the pH of the binder compositions was significantly higher when no additional organic acid was added to the binder, while the addition of either maleic acid or citric acid reduced the pH of the binder composition to below 5.0.

Each of the binder compositions was formulated into 25 g samples having a 50 wt. % solids level and mixed with 1000 g of glass beads to make uncured composites. Roughly 1 ounce samples of the uncured composites were then spread into dogbone molds and pressed in the molds at a pressure of about 10,000 lbs. The dogbone samples were then released from the molds and heated at about 400° F. for about 20 minutes to form cured dogbone composites. The cured dogbone composites were roughly 25 mm wide and 6 mm thick.

Figure 2:
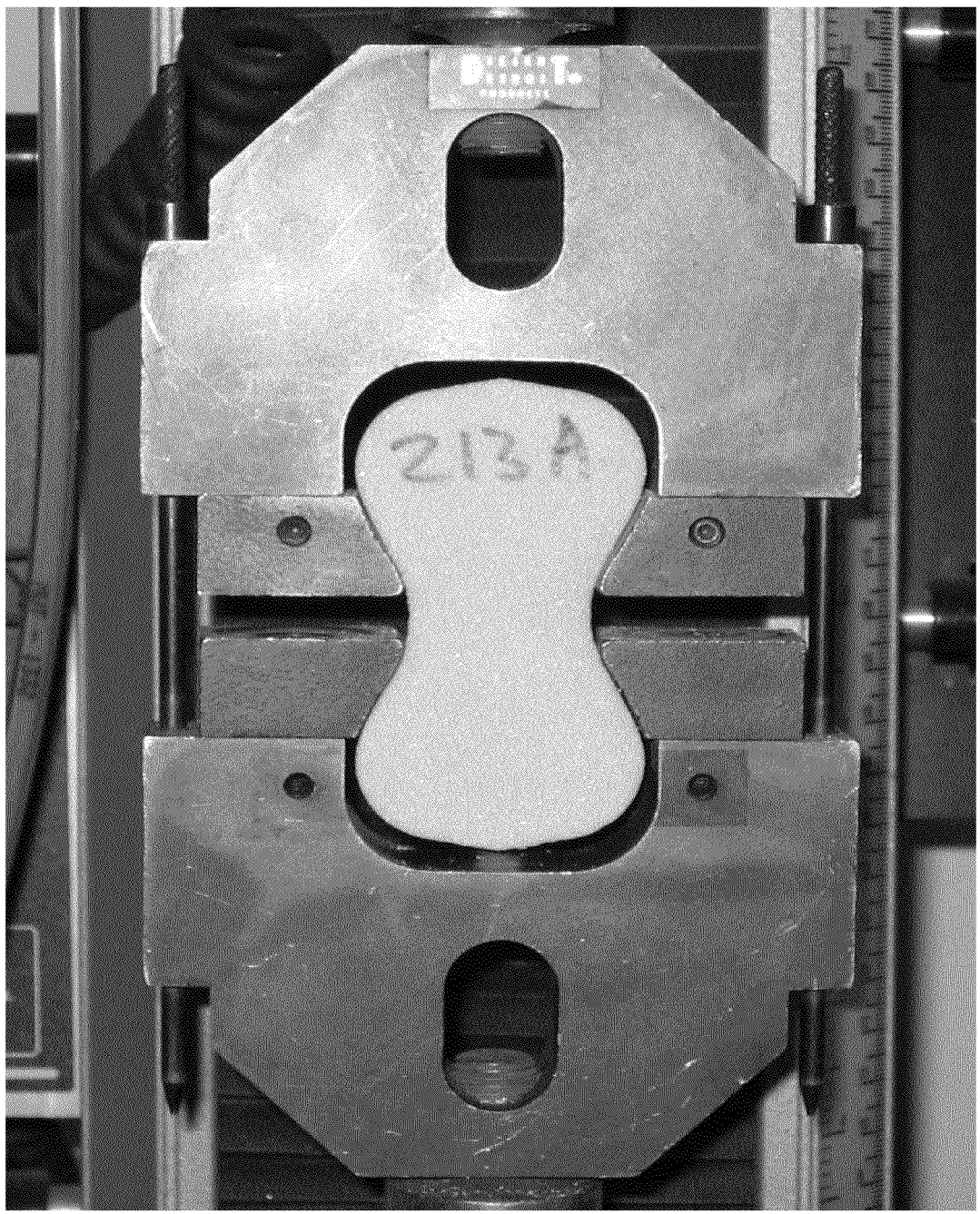
FIG. 2 is a picture of a cured dogbone composite placed in an Instron tensile strength measuring instrument.

The cured dogbone composites were tested for tensile strength in both an unaged condition and after being aged in a high humidity atmosphere. The unaged composites were taken directly from the curing oven and placed in an Instron tensile strength testing instrument (Harry W. Dietert Co.—Tensile Core Grip Assembly Part No. 610-7CA) as shown in FIG. 2. The aged composites were taken from the curing oven and placed for 24 hours in a humidifying oven set at approximately 95% humidity and 120° F. After the aged samples were cooled for approximately 8 hours, they were placed in the Instron instrument to test their tensile strength.

FIG. 1 shows the results of the dogbone tensile strength tests for composites made using the five different binder compositions shown in Table 3 plus a "control" composition made from a conventional polyacrylic acid (Dow Chemical Acrylic Resin QRXP-1765 cured with triethanol amine) having a pH of 2.8. The results in FIG. 1 show significant improvement in the tensile strength of the dogbone composites made from binder compositions that were acidified by the addition of an organic acid. Composites made with the EPD binder compositions that were acidified with either maleic or citric acid had an increased tensile strength of approximately 10% to 32% compared to the composite made with the unacidified EPD binder composition. The composites made with the acidified HPD binder composition showed an even larger increase in tensile strength (~36%) compared with the composite made with the unacidified HPD composition. A pattern of increased tensile strength with lower pH was observed in both the unaged and the aged composites. The five composites made with the EPD and HPD binder compositions demonstrated higher tensile strength than the control composite made from a conventional polyacrylic acid binder composition.

The experimental results of adding an organic acid to the amine/phosphoric acid/dextrose binder compositions show that the addition of these acids in amounts that reduce the binder composition's pH below 5.0 can significantly increase the tensile strength of composites made with the acidified binder compositions. A reduction in the alkalinity of the binder compositions may also increase their tensile strength for compositions still having a pH above 5.0, although the magnitude of the increase may not be as large.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A formaldehyde-free binder composition comprising:
   an aldehyde or ketone;
   a nitrogen-containing salt of an inorganic acid; and
   an acidic compound that lowers the pH of the binder composition to about 5 or less.

2. The formaldehyde-free binder composition of claim 1, wherein the acidic compound comprises an organic acid.

3. The formaldehyde-free binder composition of claim 1, wherein the acidic compound comprises a polycarboxylic acid.

4. The formaldehyde-free binder composition of claim 1, wherein the acidic compound comprises a dicarboxylic acid.

5. The formaldehyde-free binder composition of claim 1, wherein the acidic compound comprises one or more organic acids chosen from a $C_1$-$C_{12}$ carboxylic acid, an aromatic carboxylic acid, oxalic acid, malonic acid, succinic acid, glutaric acid, adipic acid, pimelic acid, suberic acid, azelaic acid, sebacic acid, undecanedioic acid, dodecanedioic acid, maleic acid, fumaric acid, glutaconic acid, traumatic acid, itaconic acid, muconic acid, phthalic acid, isophthalic acid, and terephthalic acid, citric acid, isocitric acid, aconitic acid, propane-1,2,3-tricarboxylic acid, trimesic acid, mellitic acid, and tartaric acid.

6. The formaldehyde-free binder composition of claim 1, wherein the acidic compound comprises citric acid.

7. The formaldehyde-free binder composition of claim 1, wherein the acidic compound comprises maleic acid.

8. The formaldehyde-free binder composition of claim 1, wherein the aldehyde or ketone is a reducing sugar.

9. The formaldehyde-free binder composition of claim 1, wherein the nitrogen-containing salt is an unsubstituted ammonium salt.

10. The formaldehyde-free binder composition of claim 1, wherein the nitrogen-containing salt is a substituted ammonium salt.

11. The formaldehyde-free binder composition of claim 1, wherein the nitrogen-containing salt is a substituted ammonium salt having a polyammonium ion.

12. The formaldehyde-free binder composition of claim 11, wherein the polyammonium ion has at least one primary amine group.

13. The formaldehyde-free binder composition of claim 11, wherein the polyammonium ion is chosen from ethylene diammonium ion, 1,3-propanediammonium ion, 1,4-butanediammonium ion, 1,5-pendanediammonium ion, 1,6-hexanediammonium ion, α,α'-diaminoxylene ion, diethylenetriammonium ion, triethylenetetraammonium ion, tetraethylenepentammonium ion, and diamino benzene ion.

14. The formaldehyde-free binder composition of claim 1, wherein the inorganic acid is phosphoric acid.

15. The formaldehyde-free binder composition of claim 1, wherein:
the aldehyde or ketone is dextrose;
the nitrogen-containing salt of the inorganic acid comprises ethylene diammonium phosphate or hexamethylene diammonium phosphate; and
the acidic compound comprises maleic acid or citric acid.

16. The formaldehyde-free binder composition of claim 1, wherein the binder composition comprises one or more additional compounds chosen from adhesion promoters, oxygen scavengers, moisture repellants, solvents, emulsifiers, pigments, fillers, anti-migration aids, coalescent aids, wetting agents, biocides, plasticizers, organosilanes, anti-foaming agents, colorants, waxes, suspending agents, anti-oxidants, and crosslinking catalysts.

17. A fiber-reinforced composite comprising:
glass fibers; and
a cured binder formed from a binder composition comprising:
an aldehyde or ketone,
a nitrogen-containing salt of an inorganic acid; and
an acidic compound that lowers the pH of the binder composition to about 5 or less.

18. The fiber-reinforced composite of claim 17, wherein the fiber-reinforced composite comprises a fiberglass building insulation.

19. The fiber-reinforced composite of claim 17, wherein for the binder composition:
the aldehyde or ketone is dextrose;
the nitrogen-containing salt of the inorganic acid comprises ethylene diammonium phosphate or hexamethylene diammonium phosphate; and
the acidic compound comprises maleic acid or citric acid.

20. A method of binding fiberglass, the method comprising:
applying a binder composition to a mat of fiberglass; and
curing the binder composition applied to the fiberglass,
wherein the binder composition comprises:
an aldehyde or ketone,
a nitrogen-containing salt of an inorganic acid; and
an acidic compound that lowers the pH of the binder composition to about 5 or less.

\* \* \* \* \*